United States Patent
Chang et al.

(10) Patent No.: US 9,052,418 B2
(45) Date of Patent: Jun. 9, 2015

(54) LIGHT SOURCE MODULE

(71) Applicants: Industrial Technology Research Institute, Hsinchu (TW); KARL STORZ GmbH&Co.KG, Tuttlingen (DE)

(72) Inventors: Hsueh-Chih Chang, Changhua County (TW); Hung-Lieh Hu, Hsinchu (TW); Chao-Wei Li, Hsinchu (TW)

(73) Assignees: Industrial Technology Research Institute, Hsinchu (TW); KARL STORZ GmbH&Co.KG, Tuttlingen (DE)

( * ) Notice: Subject to any disclaimer, the term of this patent is extended or adjusted under 35 U.S.C. 154(b) by 90 days.

(21) Appl. No.: 14/049,192

(22) Filed: Oct. 8, 2013

(65) Prior Publication Data
US 2015/0098240 A1  Apr. 9, 2015

(51) Int. Cl.
*F21V 7/04* (2006.01)
*F21V 8/00* (2006.01)

(52) U.S. Cl.
CPC ............ *G02B 6/0006* (2013.01); *G02B 6/0008* (2013.01)

(58) Field of Classification Search
CPC ... G02B 6/0006; G02B 6/0008; G02B 6/0005
USPC ......................................................... 362/555
See application file for complete search history.

(56) References Cited

U.S. PATENT DOCUMENTS

| | | | |
|---|---|---|---|
| 6,560,385 B2 | 5/2003 | Guida et al. | |
| 6,692,431 B2 | 2/2004 | Kazakevich | |
| 7,063,663 B2 | 6/2006 | Kazakevich | |
| 7,254,296 B2 | 8/2007 | Lam et al. | |
| 7,345,312 B2 | 3/2008 | Kazakevich | |
| 7,403,680 B2 | 7/2008 | Simbal | |
| 7,668,450 B2 | 2/2010 | Todd et al. | |
| 7,898,665 B2 | 3/2011 | Brukilacchio et al. | |
| 8,083,375 B2 * | 12/2011 | Kong | 362/249.02 |
| 8,098,375 B2 | 1/2012 | Brukilacchio | |
| 2004/0014012 A1 | 1/2004 | Sadler | |
| 2005/0116179 A1 | 6/2005 | Aguirre et al. | |
| 2006/0044820 A1 | 3/2006 | Ruffin | |

(Continued)

FOREIGN PATENT DOCUMENTS

| | | |
|---|---|---|
| TW | 200402894 | 2/2004 |
| TW | 200700885 | 1/2007 |
| TW | 201024622 | 7/2010 |

OTHER PUBLICATIONS

Claudia B, Jaffe; et al., "New lighting for the design of high quality biomedical devices," SPIE Proceedings on Design and Quality for Biomedical Technologies II, vol. 7170, Jan. 24, 2009, pp. 1-9.

(Continued)

*Primary Examiner* — Evan Dzierzynski
(74) *Attorney, Agent, or Firm* — Jianq Chyun IP Office

(57) ABSTRACT

A light source module optically coupled to an optical fiber which has a light incident surface is provided. The light source module includes a plurality of light sources and a concentrator. The light sources surround an axis, and the axis passes through a center of the light incident surface and is perpendicular to the light incident surface. Each of the light sources is capable of emitting a beam along a transmitting path toward the axis. The concentrator is disposed at the axis and includes a curvy reflective surface located on the transmitting paths for reflecting the beams to the light incident surface of the optical fiber.

25 Claims, 5 Drawing Sheets

(56) References Cited

U.S. PATENT DOCUMENTS

2008/0210953 A1* 9/2008 Ladstatter et al. ............. 257/88
2011/0149246 A1   6/2011 Artsyukhovich
2011/0286212 A1* 11/2011 Furuta ........................ 362/231

OTHER PUBLICATIONS

Alex C H Lee; et al., "Solid-state semiconductors are better alternatives to arc-lamps for efficient and uniform illumination in minimal access surgery," Surg Endosc, Dec. 11, 2007, pp. 1-9.

James Larimer, "A Laser Light Source for Endoscopy," Versatile Power, Jan. 24, 2010, pp. 1-26.

Thomas Brukilacchio; et al., "Beyond the Limitations of Today's LED Packages: Optimizing High Brightness LED Performance by a Comprehensive Systems Design Approach," SPIE Proceedings on Light-Emitting Diodes: Research, Manufacturing, and Applications VIII, vol. 5366, Jan. 26, 2004, pp. 1-12.

Utzinger U.; et al., "Fiber Optic Probes for Biomedical Optical Spectroscopy," Master's thesis, Feb. 2001, Biomedical Engineering and Obstetrics & Gynecology, University of Arizona.

Thomas Weyh; et al., "Developing a Fiber-Coupled LED Cold-Light Source," European Medical Device Technology, Dec. 9, 2010, pp. 1-5.

"Office Action of Taiwan Counterpart Application", issued on Mar. 25, 2015, pp. 1-4.

* cited by examiner

LIGHT SOURCE MODULE

TECHNICAL FIELD

The technical field generally relates to a light source module.

BACKGROUND

Recently, optical fiber apparatuses adopting light emitting diodes (LEDs) as light sources have gradually held considerable market share. The luminescence efficiency of the LEDs is about 5% to 8%, and the LEDs have different luminescence spectrums available for selection, including red, green and blue spectrums. The LEDs have excellent luminescence spectrums, i.e. having a high spectrum peak value and a narrow spectrum width, and, therefore, can be used as light sources for optical fiber apparatuses.

However, the dilemma encountered in most optical fiber apparatuses is that the cross-sectional area of the light beam emitted by a LED often being much greater than the light incident surface of an optical fiber. Under the condition of Etendue conservation and the limitation in diameter of an optical fiber, the light beam within the tolerable divergence angle may be effectively coupled to the optical fiber. Therefore, limited by the tolerable divergence angle of an optical fiber, conventional light sources fail to effectively achieve the satisfied light-extraction efficiency and optical-coupling efficiency.

SUMMARY

Accordingly, an exemplary embodiment of the disclosure is directed to a light source module optically coupled to an optical fiber.

An exemplary embodiment of the disclosure provides a light source module optically coupled to an optical fiber which has a light incident surface. The light source module includes a plurality of light sources and a concentrator. The light sources surround an axis, and the axis passes through a center of the light incident surface and is perpendicular to the light incident surface. Each of the light sources is capable of emitting a beam along a transmitting path toward the axis. The concentrator is disposed at the axis and includes a curvy reflective surface located on the transmitting paths for reflecting the beams to the light incident surface of the optical fiber.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
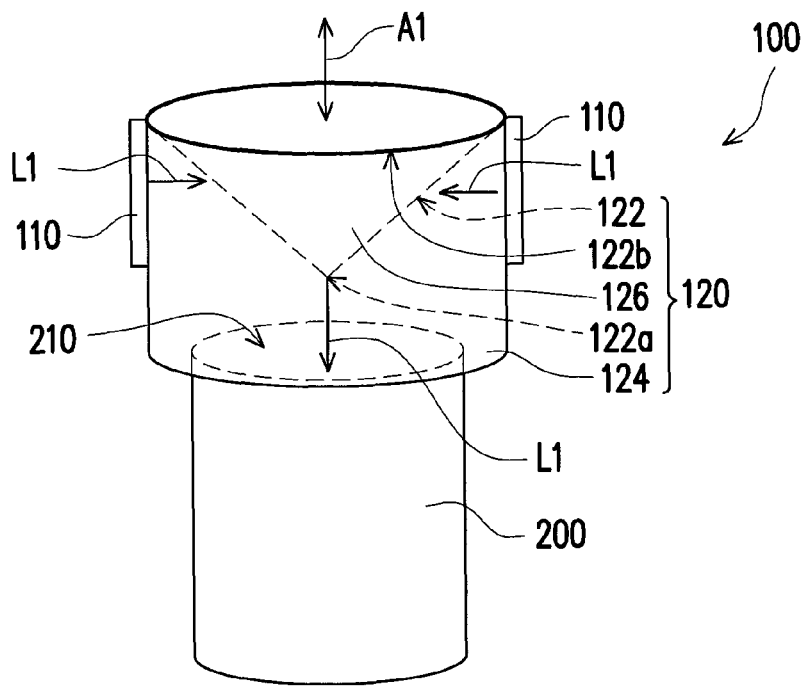
FIG. 1 is a schematic view of a light source module according to an exemplary embodiment.
Figure 2:
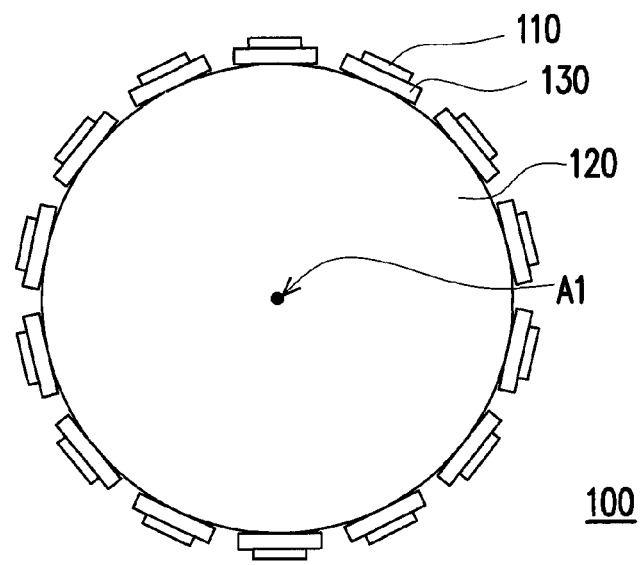
FIG. 2 is a top view of the light source module in FIG. 1.

FIG. 1 is a schematic view of a light source module according to an exemplary embodiment. FIG. 2 is a top view of the light source module in FIG. 1. Referring to FIG. 1 and FIG. 2, in the embodiment, a light source module 100 is optically coupled to an optical fiber 200 for collecting the beams L1 emitted by light sources 110 and reflecting the beams L1 to a light incident surface 210 of the optical fiber 200. The light source module 100 includes a plurality of light sources 110 and a concentrator 120. In the embodiment, each of the light sources 110 may be a dot light source, for example, a light-emitting diode (LED). The light sources 110 surround an axis A1 in, for example, circular arrangement as shown in FIG. 2. The axis A1, for example, passes through a center of the light incident surface 210 and is perpendicular to the light incident surface 210 as shown in FIG. 1. Each of the light sources 110 is capable of emitting a beam L1 along a transmitting path toward the axis A1. In the embodiment, a plurality of collimators 130 may be disposed on the light sources 110 respectively for collimating the beams L1 emitted by the light sources 110.

The concentrator 120 is disposed at the axis A1 and includes a curvy reflective surface 122 located on the transmitting paths of the beams L1 for reflecting the beams L1 to the light incident surface 210 of the optical fiber 200. In the embodiment, the concentrator 120 may include a reflector 126, and the reflector 126 has the curvy reflective surface 122. The curvy reflective surface 122 is a cone-shaped curvy reflective surface. In detail, an apex 122a of the cone-shaped curvy reflective surface 122 is located on the axis A1, and the apex 122a is located between the light incident surface 210 and a base side 122b of the cone-shaped curvy reflective surface 122. To be more specific, the apex 122a and the base side 122b of the curvy reflective surface 122 are opposite to each other as shown in FIG. 1, and a contour line of the curvy reflective surface 122 from the apex 122a to a point on the base side 122b is a straight line as shown in FIG. 1.

Of course, the disclosure is not limited thereto. In other embodiments, the contour line of the curvy reflective surface 122 from the apex 122a to a point on the base side 122b may also be, for example, a parabolic curve, an elliptic curve, an aspheric line, a plurality of straight-line segments, a plurality of curve segments, or any combination thereof, etc. Also, in yet another embodiment, the cross section of the curvy reflective surface 122 along the axis A1 may be a hyperbolic curve. Various modifications and adjustments can be made to the curvy reflective surface 122 according to actual demands as long as the beams L1 emitted by the light sources 110 can be reflected to the light incident surface 210 by the curvy reflective surface 122. In the embodiment, the curvy reflective surface 122 is coated with a reflective coating. In other embodiment, however, the reflector 126 having the curvy reflective surface 122 may be made of metal, and the reflector 126 may be a solid structure or a hollow structure.

With the disposition described above, the beams L1 emitted by multiple light sources 110 surrounding the axis A1 can be reflected to one optical fiber 200. Accordingly, high-power light sources with illumination area greater than the area of the light incident surface 210 of the optical fiber 200 can be adopted as light sources, and the beams emitted by the light sources can be concentrated and reflected to the light incident surface 210 of the optical fiber 200, so as to reduce light loss and increase light-extraction efficiency and optical-coupling efficiency.

Figure 3:
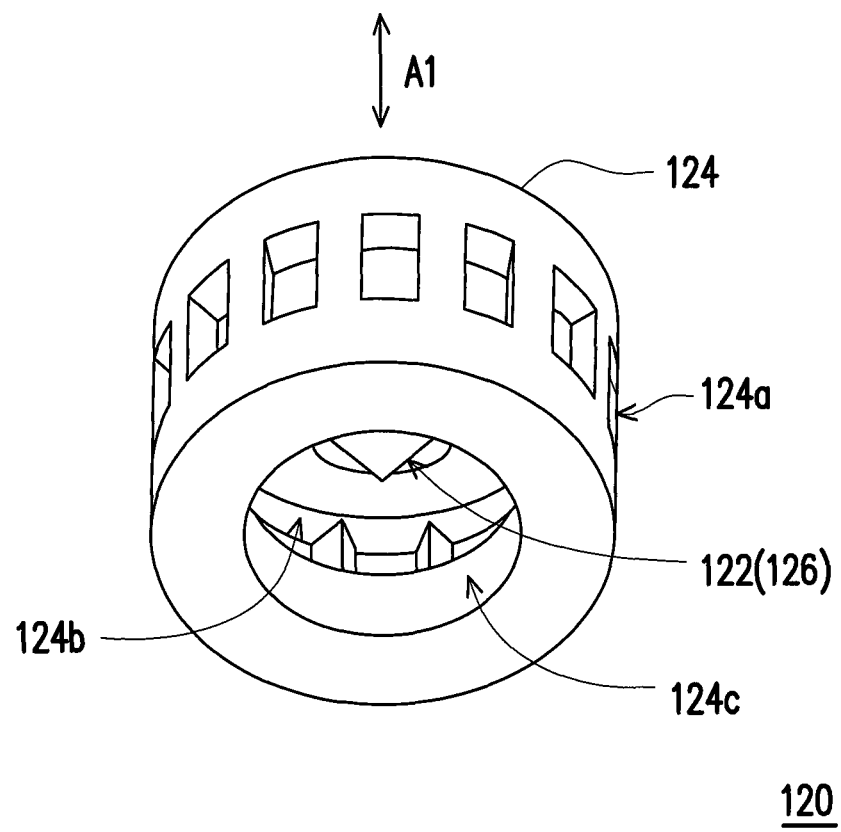
FIG. 3 is a partial component schematic view of a light source module according to an exemplary embodiment.

FIG. 3 is a partial component schematic view of a light source module according to an exemplary embodiment. In the embodiment, the concentrator 120 may further include a first guiding component 124 and a reflector 126. The first guiding component 124 is disposed at the axis A1, and the light sources, for example, the light sources 110 shown in FIG. 1 and FIG. 2, may be disposed on a side surface 124a of the first guiding component 124 for emitting the beams into the first guiding component 124. The first guiding component 124, as shown in FIG. 3, includes a light guiding chamber 124b having a light exit opening 124c and the light exit opening 124c is aligned with the light incident surface (as the light incident surface 210 of the optical fiber 200 illustrated in FIG. 1).

In addition, the reflector 126 having the curvy reflective surface 122 is disposed on the first guiding component 124, and the curvy reflective surface 122 is extended into light guiding chamber 124b, such that the beams is emitted into the light guiding chamber 124b by the light sources and reflected to the light exit opening 124c by the curvy reflective surface 122 of the reflector 126. The light exiting opening 124c may also be the alignment target for the first guiding component 124 to be aligned with the light incident surface 210 of the optical fiber 200 as shown in FIG. 1. In the embodiment, the material of the first guiding component 124 in FIG. 3 maybe a reflective material or a transparent material with reflective coating, and a plurality of collimators, for example, the collimators 130 shown in FIG. 2, may be disposed on the first guiding component 124 corresponding to the light sources. To be specific, each of the collimators may be disposed between the corresponding light source 110 and the first guiding component 124.

Figure 4:
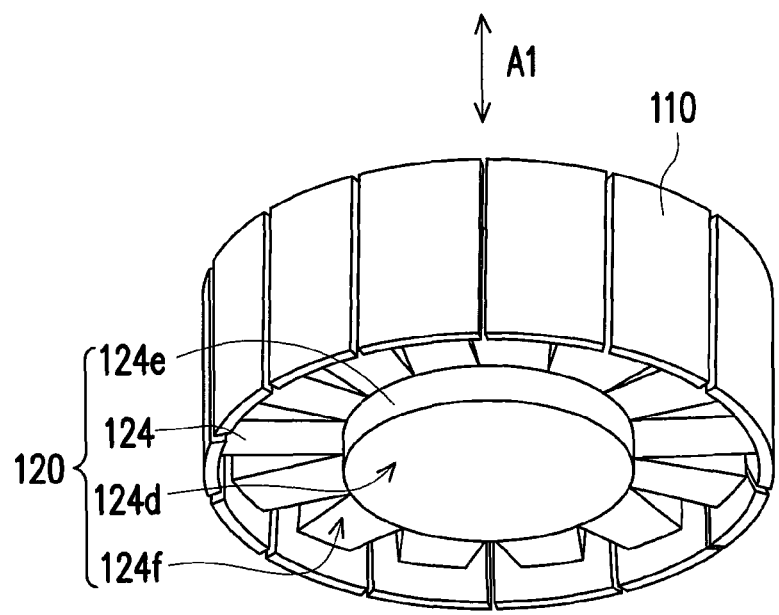
FIG. 4 is a schematic view of a light source module according to an exemplary embodiment.
Figure 5:
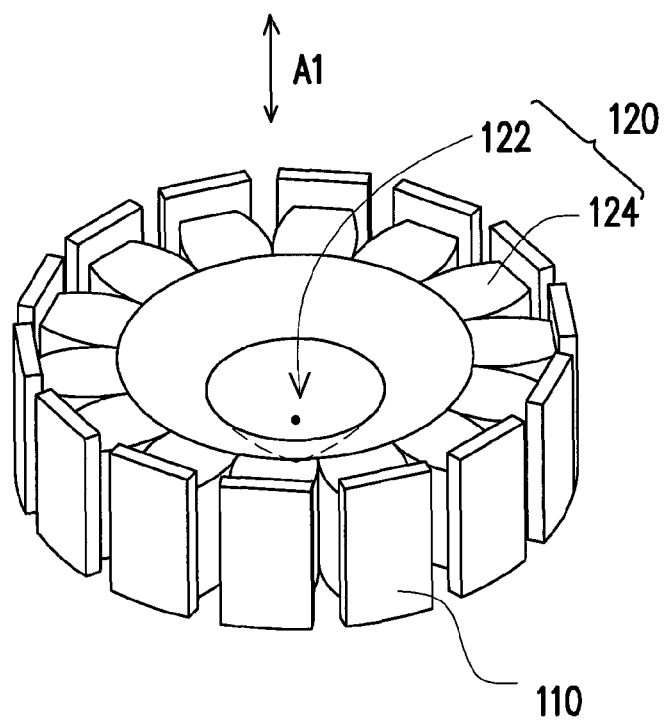
FIG. 5 is another schematic view of the light source module in FIG. 4.

FIG. 4 is a schematic view of a light source module according to an exemplary embodiment. FIG. 5 is another schematic view of the light source module in FIG. 4. It is noted that FIG. 4 and FIG. 5 illustrate schematic views of the light source module 100 from different view angles. Referring to both FIG. 4 and FIG. 5, in the embodiment, the concentrator 120 may include a first guiding component 124. The first guiding component 124 is disposed at the axis A1, and the light sources 110 are disposed on a side surface of the first guiding component 124 for emitting the beams into the first guiding component 124. In the embodiment, the first guiding component 124 may be a solid structure without the light guiding chamber, and the first guiding component 124 includes a light exit surface 124d, as shown in FIG. 4, the curvy reflective surface 122, as shown in FIG. 5, and a light pattern adjusting component 124e having the light exit surface 124d, as shown in FIG. 4. The light pattern adjusting component 124e is located between the optical fiber (as the optical fiber 200 illustrated in FIG. 1) and the curvy reflective surface 122 for guiding the beams reflected by the curvy reflective surface 122 to the light exit surface 124d. The light exit surface 124d faces the light incident surface (as the light incident surface 210 of the optical fiber 200 illustrated in FIG. 1), such that the beams emitted into the first guiding component 124 is reflected to the light exit surface 124d by the curvy reflective surface 122.

In the embodiment, the first guiding component 124 may be made of transparent material, and the curvy reflective surface 122 is coated with reflective coating. Of course, the disclosure is not limited thereto. In other embodiment, the curvy reflective surface 122 may be a total internal reflection (TIR) surface by adopting the characteristic of the material of the first guiding component 124. In this manner, no reflective coating is needed to cover the curvy reflective surface 122. In addition, a plurality of collimators may be disposed on the first guiding component 124 corresponding to the light sources 110. To be specific, each of the collimators are disposed between the corresponding light source 110 and the first guiding component 124 for collimating the beams emitted by the light sources 110.

In addition, a partial surface 124f of the first guiding component 124 facing the light incident surface (as the light incident surface 210 of the optical fiber 200 illustrated in FIG. 1) except the light exit surface 124d is also covered with reflective coating, such that the beams may be concentrated and mixed in the first guiding component 124 and then reflected to the light incident surface through the light exit surface 124d. Moreover, the light exit surface 124d may be a rough surface or coated with anti-reflection coating to increase the light-extraction efficiency. In the embodiment, a color conversion material may be disposed on the light exit surface 124d for converting the color light emitted by the light sources 110 into white light. The color conversion material may be, for example, fluorescent or phosphor powder. In the embodiment, the color conversion material is disposed on the light exit surface 124d instead of being disposed on the light sources 110, such that the life span of the color conversion material is increased and the light-extraction efficiency can be improved.

Figure 6:
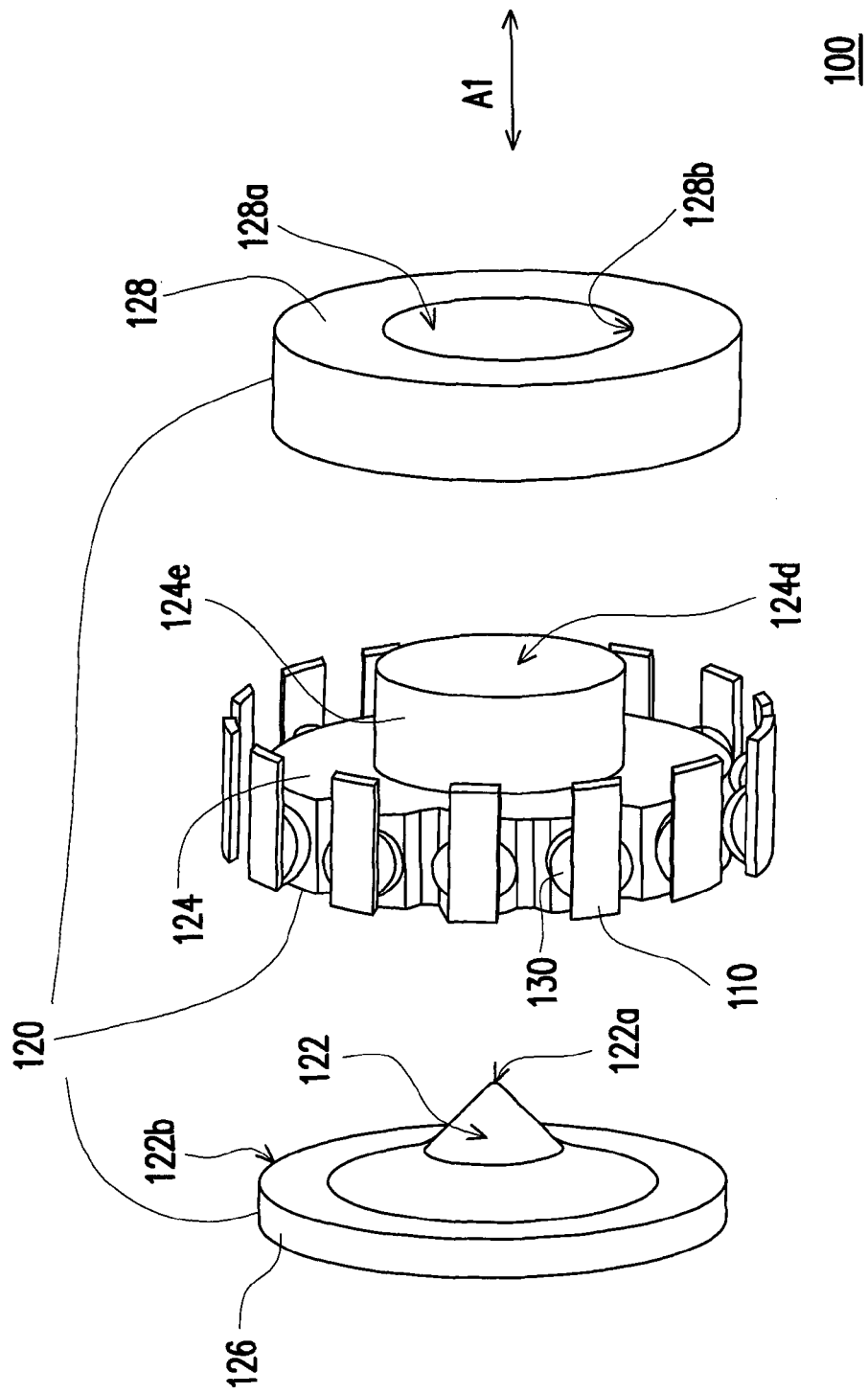
FIG. 6 is an exploded view of a light source module according to an exemplary embodiment.

FIG. 6 is an exploded view of a light source module according to an exemplary embodiment. Referring to FIG. 6, in the light source module 100 of the embodiment, the concentrator 120 may further include a first guiding component 124 and a reflector 126. The first guiding component 124 is disposed at the axis A1, and the light sources 110 are disposed on a side surface of the first guiding component 124 for emitting the beams into the first guiding component 124. The first guiding component 124 includes a light exit surface 124d facing the light incident surface (as the light incident surface 210 of the optical fiber 200 illustrated in FIG. 1). The reflector 126 includes the curvy reflective surface 122 and is disposed on the first guiding component 124, and the top surface of the first guiding component 124 is conformal with the curvy reflective surface 122, such that the beams emitted into the first light guiding component 124 by the light sources 110 are reflected to the light exit surface 124d by the curvy reflective surface 122 of the reflector 126. In the embodiment, a contour line of the curvy reflective surface 122 from the apex 122a to a point on the base side 122b is a polygonal line composed of a plurality of straight-line segments as shown in FIG. 6, but the disclosure is not limited thereto.

In the embodiment, the material of the first guiding component 124 is a transparent material, and the curvy reflective surface 122 may be coated with reflective coating. Of course, in other embodiment, the reflector 126 having the curvy reflective surface 122 may also be a solid structure or a hollow structure made of metal. In addition, a plurality of collimators 130 may be disposed on the first guiding component 124 corresponding to the light sources 110. To be specific, each of the collimators 130 are disposed between the corresponding light source 110 and the first guiding component 124 for collimating the beams emitted by the light sources 110.

In the embodiment, the first guiding component 124 may further include a light pattern adjusting component 124e. The light pattern adjusting component 124e has the light exit surface 124d. The light pattern adjusting component 124e is located between the optical fiber and the curvy reflective surface 122 for guiding the beams reflected by the curvy reflective surface 122 to the light exit surface 124d. The light pattern adjusting component 124e may be, for example, Fresnel lens, fly-eye lens, concave lens, convex lens or condenser lens.

In addition, the concentrator 120 may further include a second guiding component 128. The second guiding component 128 has a through hole 128a and may be in ring shape or cone shape. The light pattern adjusting component 124e is located in the through hole 128a and is engaged therewith. An inner surface 128b of the second guiding component 128 may be covered with reflective coating for further concentrating and guiding the beams to the light exit surface 124d, wherein the inner surface 128b defines the through hole 128a and contact the light pattern adjusting component 124e. A color conversion material may be disposed on the light exit surface 124d for converting the color light emitted by the light sources 110 into white light.

Figure 7:
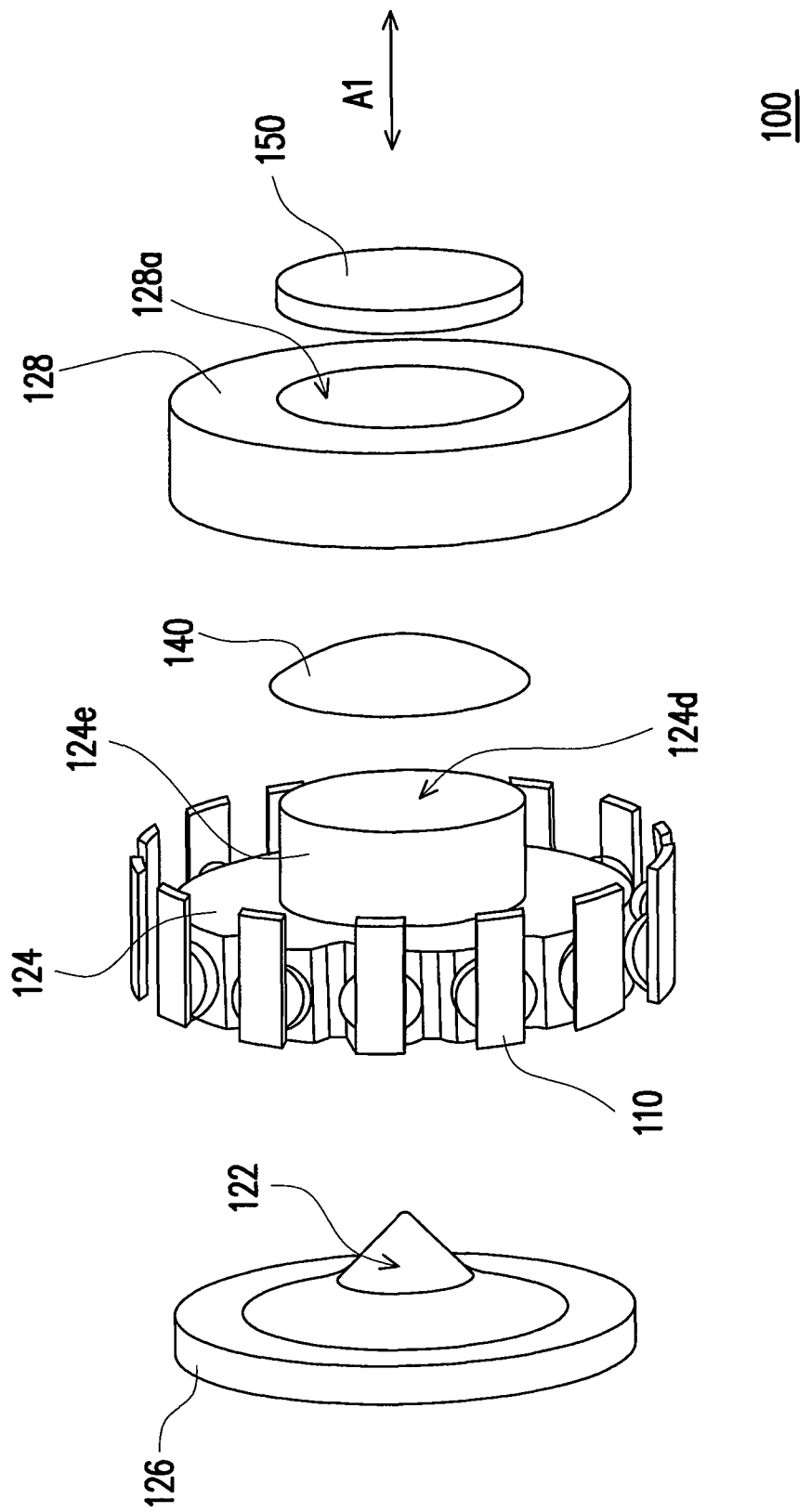
FIG. 7 is an exploded view of a light source module according to an exemplary embodiment.

FIG. 7 is an exploded view of a light source module according to an exemplary embodiment. Referring to FIG. 7, it should be noted the components and partial details of the light source module 100 hereinafter provided in the embodiment is very similar to the previous embodiment shown in FIG. 6, accordingly, the same details regarding the same components are omitted, which can refer to the previous embodiment. In the embodiment, the light source module 100 may further includes a lens 140 and a cover lens 150 to further adjust the pattern of the beams. The lens 140 may be disposed on the light pattern adjusting component 124e and facing the light incident surface (as the light incident surface 210 of the optical fiber 200 illustrated in FIG. 1), and the cover lens 150 covers the through hole 128a. In the embodiment, the cover lens 150 may be a glass cover lens and the surface facing the second guiding component 128 may include a lenslet array. In addition, a color conversion material may be disposed on the cover lens 150 for converting the color light emitted by the light sources 110 into white light. The color conversion material may be, for example, fluorescent or phosphor powder. In the embodiment, the color conversion material is disposed on the cover lens 150 instead of being disposed right on the light sources, such that the life span of the color conversion material is increased and the light-extraction efficiency can be improved.

In sum, the embodiments of the disclosure provide various implementations of a light source module. Generally speaking, the light sources of the light source module surround an axis of the optical fiber to emit beams toward the axis. The concentrator of the light source module includes a curvy reflective surface located on the transmitting paths of the beams for reflecting the beams to the light incident surface of the optical fiber. Accordingly, the beams emitted by multiple light sources can be concentrated and reflected to a light incident surface of an optical fiber, so as to increase the light-extraction efficiency and optical-coupling efficiency.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A light source module, optically coupled to an optical fiber having a light incident surface, the light source module comprising:
    a plurality of light sources surrounding an axis, the axis passing through a center of the light incident surface and substantially perpendicular to the light incident surface, each of the light sources being capable of emitting a beam along a transmitting path toward the axis; and
    a concentrator disposed at the axis and comprising a curvy reflective surface located on the transmitting paths for reflecting the beams to the light incident surface of the optical fiber.

2. The light source module as claimed in claim 1, wherein the curvy reflective surface is a cone-shaped curvy reflective surface, and an apex of the cone-shaped curvy reflective surface is located on the axis and the apex is located between the light incident surface and a base side of the cone-shaped curvy reflective surface.

3. The light source module as claimed in claim 1, wherein the curvy reflective surface comprises an apex and a base side opposite to the apex, a contour line of the curvy reflective surface from the apex to a point on the base side comprises a straight line, a parabolic curve, an elliptic curve, an aspheric line, a plurality of straight-line segments, a plurality of curve segments or a combination thereof.

4. The light source module as claimed in claim 1, wherein a cross section of the curvy reflective surface along the axis comprises a hyperbolic curve.

5. The light source module as claimed in claim 1, further comprising a reflective coating covering the curvy reflective surface.

6. The light source module as claimed in claim 1, wherein each of the light sources is a dot light source.

7. The light source module as claimed in claim 1, wherein each of the light sources is a light-emitting diode (LED).

8. The light source module as claimed in claim 1, wherein the concentrator comprises a reflector which has the curvy reflective surface.

9. The light source module as claimed in claim 1, wherein the concentrator comprises a first guiding component disposed at the axis, and the light sources are disposed on a side surface of the first guiding component for emitting the beams into the first guiding component.

10. The light source module as claimed in claim 9, wherein a material of the first guiding component is a transparent material.

11. The light source module as claimed in claim 9, wherein the curvy reflective surface is a total internal reflection (TIR) surface.

12. The light source module as claimed in claim 9, further comprising a plurality of collimators disposed on the first guiding component corresponding to the light sources, wherein each of the collimators is disposed between the corresponding light source and the first guiding component.

13. The light source module as claimed in claim 9, wherein the concentrator further comprises a reflector disposed on the first guiding component and comprising the curvy reflective surface, the first guiding component comprises a light guiding chamber which has a light exit opening aligned with the light incident surface, and the beams is emitted into light guiding chamber by the light sources and reflected to the light exit opening by the curvy reflective surface of the reflector.

14. The light source module as claimed in claim 9, wherein the first guiding component comprises a light exit surface facing the light incident surface.

15. The light source module as claimed in claim 14, wherein the first guiding component further comprises the curvy reflective surface, and the beams emitted into the first guiding component is reflected to the light exit surface by the curvy reflective surface.

16. The light source module as claimed in claim 14, further comprising a reflective coating covering a partial surface of the first guiding component facing the light incident surface except the light exit surface.

17. The light source module as claimed in claim 14, further comprising a color conversion material disposed on the light exit surface.

18. The light source module as claimed in claim 14, wherein the concentrator further comprises a reflector disposed on the first guiding component and comprising the curvy reflective surface, and the beams is emitted into the first guiding component by the light sources and reflected to the light exit surface by the curvy reflective surface of the reflector.

19. The light source module as claimed in claim 14, wherein the first guiding component further comprises a light pattern adjusting component which has the light exit surface, the light pattern adjusting component located between the optical fiber and the curvy reflective surface for guiding the beams reflected by the curvy reflective surface to the light incident surface.

20. The light source module as claimed in claim 19, wherein the light pattern adjusting component comprises Fresnel lens, fly-eye lens, concave lens, convex lens or condenser lens.

21. The light source module as claimed in claim 19, further comprising a lens disposed on the light pattern adjusting component and facing the light incident surface.

22. The light source module as claimed in claim 19, wherein the concentrator further comprises a second guiding component which has a through hole, wherein the light pattern adjusting component is engaged with the through hole.

23. The light source module as claimed in claim 22, further comprising a reflective coating covering an inner surface of the second guiding component, wherein the inner surface defines the through hole and contact the light pattern adjusting component.

24. The light source module as claimed in claim 22, further comprising a cover lens covering the through hole.

25. The light source module as claimed in claim 24, further comprising a color conversion material disposed on the cover lens.

* * * * *